United States Patent
Thompson

(10) Patent No.: US 7,027,068 B2
(45) Date of Patent: Apr. 11, 2006

(54) METHOD AND APPARATUS FOR FAST CONSTRUCTION OF COLOR CUBES

(75) Inventor: Daniel Lee Thompson, Austin, TX (US)

(73) Assignee: Autodesk, Inc., San Rafael, CA (US)

( * ) Notice: Subject to any disclaimer, the term of this patent is extended or adjusted under 35 U.S.C. 154(b) by 520 days.

(21) Appl. No.: 09/946,874

(22) Filed: Sep. 5, 2001

(65) Prior Publication Data

US 2003/0043164 A1    Mar. 6, 2003

(51) Int. Cl.
*G09G 5/02* (2006.01)
(52) U.S. Cl. ...................................... 345/589
(58) Field of Classification Search ......... 345/600–605
See application file for complete search history.

(56) References Cited

U.S. PATENT DOCUMENTS

| | | | |
|---|---|---|---|
| 5,343,311 A * | 8/1994 | Morag et al. ............... | 358/518 |
| 5,568,596 A | 10/1996 | Cawley | |
| 5,627,950 A * | 5/1997 | Stokes ........................ | 345/591 |
| 6,011,540 A * | 1/2000 | Berlin et al. ................ | 345/601 |

OTHER PUBLICATIONS

Techencyclopedia, "color palette," http://www.techweb.com/encyclopedia ©1981-2001, pp. 2.
Techencyclopedia, "RGB," http://www.techweb.com/encyclopedia © 1981-2001, pp. 1.
Techencyclopedia, "colors," http://www.techweb.com/encyclopedia © 1981-2001, pp. 1.

* cited by examiner

*Primary Examiner*—Michael Razavi
*Assistant Examiner*—Jin-Cheng Wang
(74) *Attorney, Agent, or Firm*—Gates & Cooper LLP

(57) ABSTRACT

A method, apparatus, and article of manufacture defines one or more entries in a color cube. A first color cube is obtained that has color cube entries that each define a color region. In a first technique, a second smaller color cube is obtained and a list of two or more color indices are mapped to one or more of the second color cube entries. Each entry of the first color cube is compared to the list of colors from a corresponding second color cube entry. The first color cube entry is then mapped to the index representing the most similar color. In a second technique, each color index is mapped to first color cube entries based on a distance of the color region of the first color cube entry to the location, in the first color cube, of the color represented by the index.

42 Claims, 6 Drawing Sheets

METHOD AND APPARATUS FOR FAST CONSTRUCTION OF COLOR CUBES

BACKGROUND OF THE INVENTION

1. Field of the Invention

The present invention relates generally to rendering color in computer graphics software, and in particular, to a method, apparatus, and article of manufacture for quickly constructing a color-cube or mapping from a large set of specified colors to indices for a small set of previously defined colors.

2. Description of the Related Art

The perception of the different wavelengths of light may be represented using various color models. For example, in a color model that represents transmitted colors, red, green, and blue (RGB) are used to define the visible wavelengths. In a reflective color model, cyan (light blue), magenta (purplish-red), yellow, and black (CMYK) are used to define the visible wavelengths.

The RGB color model is often used for generating video on a display screen. In the RGB color model, each pixel on a display screen may be displayed as varying intensities of red, green, and blue dots. When all three colors are turned on high, white is produced. As intensities are equally lowered, shades of gray are derived. The base color of the screen appears when all dots are off. The CMYK color model is often used for printing images on a color printer. In theory, equal parts of cyan, magenta, and yellow ink make black. However, such blacks tend to have a muddy appearance when printed. Accordingly, a pure black fourth ink may be used in the CMYK( four color process ("K" for black).

In either color model, the number of available colors may be extremely large. For example, in the RGB color model, the red component alone may comprise hundreds or thousands of different intensities. The RGB color components are often described in terms of a vector consisting of the varying red, green, and blue components. Further, the vector components may be described in terms of how many bits are used to represent them. For example, a format such as 8-8-8 (for 8 bits each) or 6-5-5 (for 6 bits for red and 5 for green and blue) may be utilized. Thus, as the number of available colors increases, the number of bits required to store the color also increases. Accordingly, the storage and processing of such large images/files may be prohibitively large. Further, certain display devices, drivers, or video cards may have a limited capability such that it may only display a small set of predefined colors (e.g., 256 colors).

To save file space and increase processing capabilities, each pixel of an image may be associated or replaced with an index (also referred to as a color index). Such a color index corresponds to an entry in a table or color palette that contains the RGB color components for a small set of predefined colors (also referred to as index colors). This smaller set of predefined colors is usually a set of 256 colors, though it could be smaller or larger. Each index color in the predefined set may also be defined in vector terms, though it is always referred to by its index in the set. Because only an index is stored with the pixel, less memory is required to store the entire image.

A common problem in computer graphics is identifying and associating/substituting the appropriate color index for each pixel in an image. For example, in the prior art, the color of each pixel may be compared to each index color to determine the most similar index color. Consequently, for each pixel, numerous comparisons may be conducted.

Prior art methodologies may also provide a mapping of numerous RGB vector colors (that likely contain the colors utilized in an image) to the index color in the predefined set whose vector definition is closest to the desired vector color. For example (12,4,9) is closer to (0,0,0) than to (255,255, 255), so (0,0,0) would be preferred. Once the mapping of RGB vector colors has been created, the color index for each color in an image may be easily determined.

To perform this mapping rapidly, prior art methods may build a table called a color cube. FIG. 1 illustrates a section view of a color cube. A color cube is an array with three-dimensions, indexed by the red (x-axis), green (y-axis), and blue (z-axis) vector components for all of the colors in a color set (e.g., all of the possible colors for a particular image). The value contained at each location in the array contains the color index into the set of predefined colors. This table is built once and reused over the life of a program or until the predefined colors are changed, whichever comes first. The size of this table can be described by the number of bits given to each vector. For example, a 4-4-4 table would give 4-bits to each red, green, and blue component, resulting in $2^4*2^4*2^4$ (16*16*16) entries, i.e. 4096 entries. A 6-6-6 table would have about 64,000 entries, and an 8-8-8 table would have 16 million entries.

An issue that arises with respect to color cubes is with the creation of the mapping or determining which color cube entry contains which index. In the prior art, the values of the color cube are determined in two different ways. The first method is to determine which index color is the best match for the RGB represented by the vector entry into the color cube. Such a determination comprises comparing the vector color for each entry in the color cube to every index color. This has the advantage of being accurate but has the disadvantage of being expensive to compute.

The second method is to set some number of colors in the predefined color set along a regular pattern and then to fill in the cube using that same regular pattern. This has the advantage of being very cheap to compute but has the disadvantage of being less accurate since it will not allow a mapping to any of the unchangeable colors in the predefined set. Hence, there is a trade-off between accuracy and computational expense between these two methods.

There is also another trade-off between accuracy and computational expense in that the larger the cube is, the more accurate it is. For example a 6-6-6 cube will distinguish between (0,0,24) and (0,0,28) while a 4-4-4 cube will not.

The problem in the prior art is with attempting to minimize these trade-offs. It is desirable to have the most accurate and largest cube that can be held in memory. To obtain such a goal, the best match for every entry in the color cube should be determined. However, processing costs associated with performing numerous comparisons in a color cube can be high. For example, a brute force computation for finding the best matches for each entry in a 6-6-6 cube mapping to a set of 256 colors would require 67 million color comparisons, each of which involves five addition/subtraction operations and three multiplication operations. To expedite processing, a minimum amount of time should be dedicated to computing the values for that cube. To minimize processing, a color cube that is less accurate may be used.

SUMMARY OF THE INVENTION

One or more embodiments of the invention provide a method, apparatus, and article of manufacture for quickly and accurately constructing a color cube and defining the color cube's entries. Two techniques (or a combination of the two techniques) may be used to define the entries in a color cube.

In the first technique, a color cube smaller than the large color cube used to map colors from an image to an appropriate index is created. Each entry of the large color cube has a corresponding entry in the smaller color cube. A list of indices (from a small set of predefined colors) is created for each entry in the smaller color cube. Each entry of the larger color cube is then compared to the list of colors from the corresponding smaller color cube entry (and/or the corresponding smaller color cube entry's neighbors). The most similar color is then mapped to the larger color cube entry.

In a second technique, the color indices are painted/mapped onto the large color cube. The location of the index color (represented by the color index) within the color cube is determined (e.g., merely by using the RGB vector color from the index to arrive at the appropriate location in the color cube). The color region containing the location is then mapped to the color index. Additionally (or alternatively), spheres (expanding or fixed size) with the location of the index color as the center of the sphere may be drawn into the color cube. The color regions/entries that contain or contact the sphere may then be mapped to the center point color index.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Two techniques (or a combination of the two techniques) define the entries in a color cube. In the first technique, each entry in a large color cube has a corresponding entry in a smaller color cube. Further, because of the difference in sizes, multiple different entries in the large color cube may correspond to the same entry in the smaller color cube (i.e., an N to 1 relationship). A list of indices are created for each entry in the smaller color cube. Each entry of the larger color cube is then compared to the list of colors from the corresponding smaller color cube entry (or the corresponding smaller color cube entry's neighbors). The most similar color is then mapped to the larger color cube entry.

In a second technique, the color indices are mapped onto the color cube to be instantiated. The location of the index color within the color cube is determined and the color region containing the location is then mapped to the color index. Additionally (or alternatively), spheres (expanding or fixed size) with the location of the index color as the center of the sphere may be drawn into the color cube. The color regions/entries that contain or contact the sphere may then be mapped to the center point color index.

Hardware Environment

Figure 2:
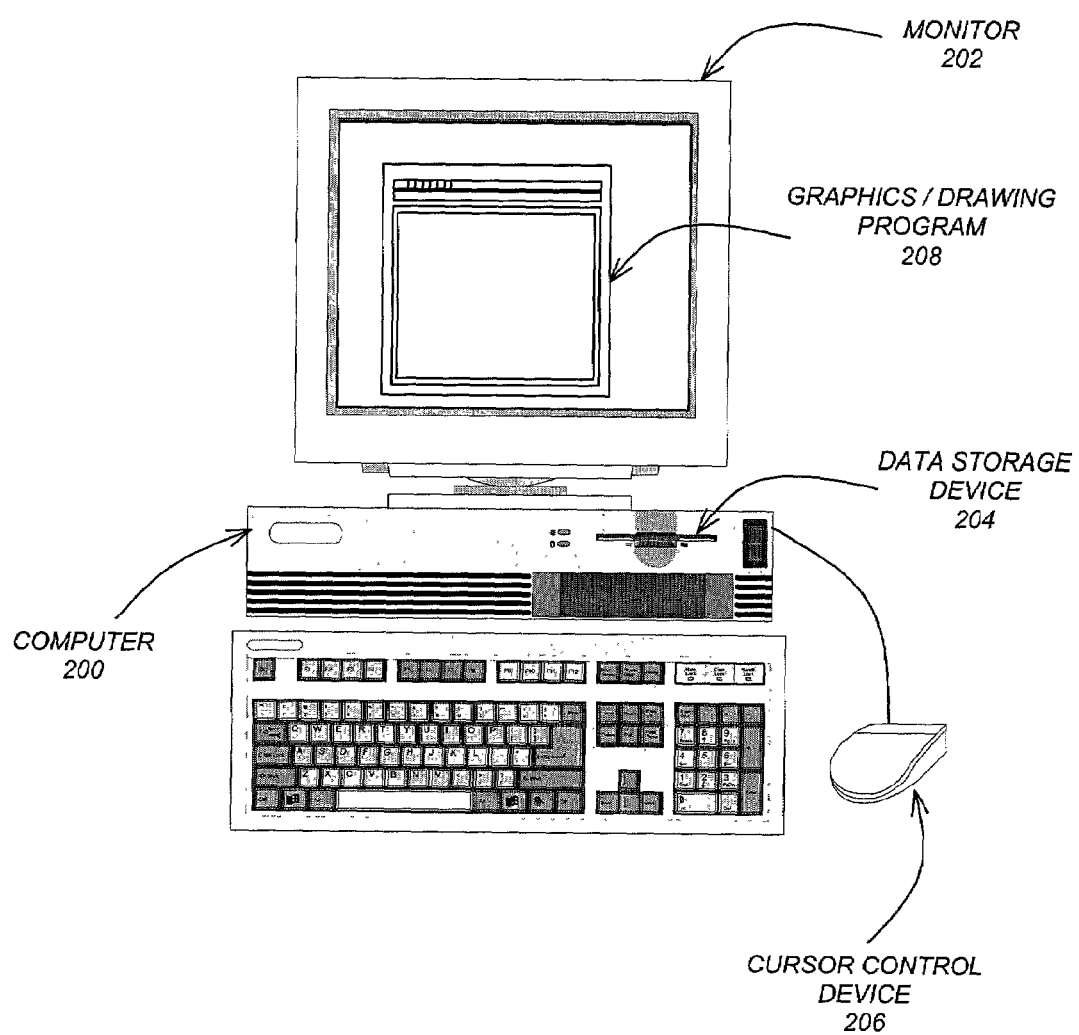
FIG. 2 is an exemplary hardware and software environment used to implement one or more embodiments of the invention.

FIG. 2 is an exemplary hardware and software environment used to implement one or more embodiments of the invention. Embodiments of the invention are typically implemented using a computer 200, which generally includes, inter alia, a monitor 202, data storage devices 204, cursor control devices 206, and other devices. Those skilled in the art will recognize that any combination of the above components, or any number of different components, peripherals, and other devices, may be used with the computer 200.

One or more embodiments of the invention are implemented by a computer-implemented graphics program 208, wherein the graphics program 208 is represented by a window displayed on the monitor 202. Generally, the graphics program 208 comprises logic and/or data embodied in or readable from a device, media, carrier, or signal, e.g., one or more fixed and/or removable data storage devices 204 connected directly or indirectly to the computer 200, one or more remote devices coupled to the computer 200 via a data communications device, etc.

Those skilled in the art will recognize that the exemplary environment illustrated in FIG. 2 is not intended to limit the present invention. Indeed, those skilled in the art will recognize that other alternative environments may be used without departing from the scope of the present invention.

Software Embodiments

In accordance with one or more embodiments of the invention, the graphics program 208 or an application (e.g., a driver) executing on computer 200 takes advantage of the topology of a color cube to reduce the number of color comparisons necessary to find the best match for each entry in the cube (i.e., to fill the cube entries with the matching index). The examination of a color cube confirms that color cube entries with the same value clump together since they are all closet to one index color than any other. There are two techniques for using this idea, and they combine together nicely: (1) the rejection of colors using a small cube, and (2) reverse mapping.

Rejection of Colors Using a Small Cube

Figure 1:
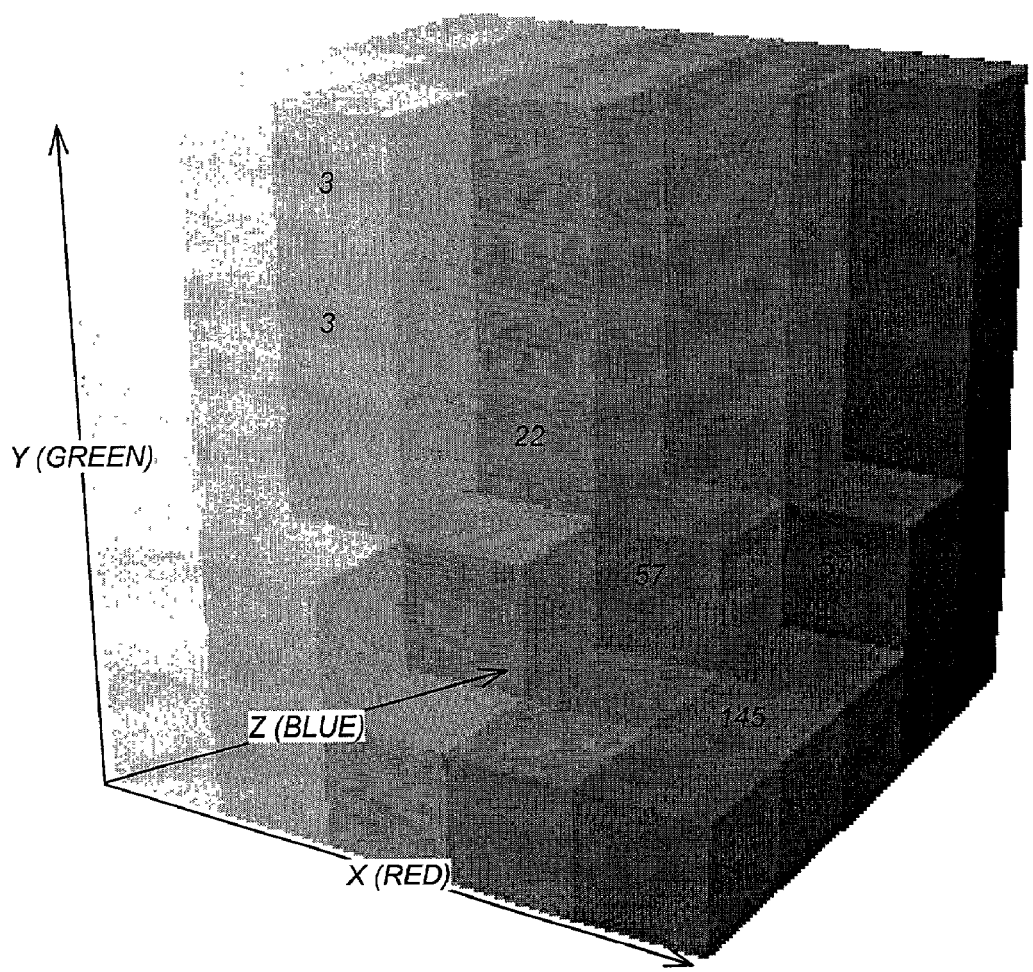
FIG. 1 illustrates a section view of a color cube.
Figure 3:
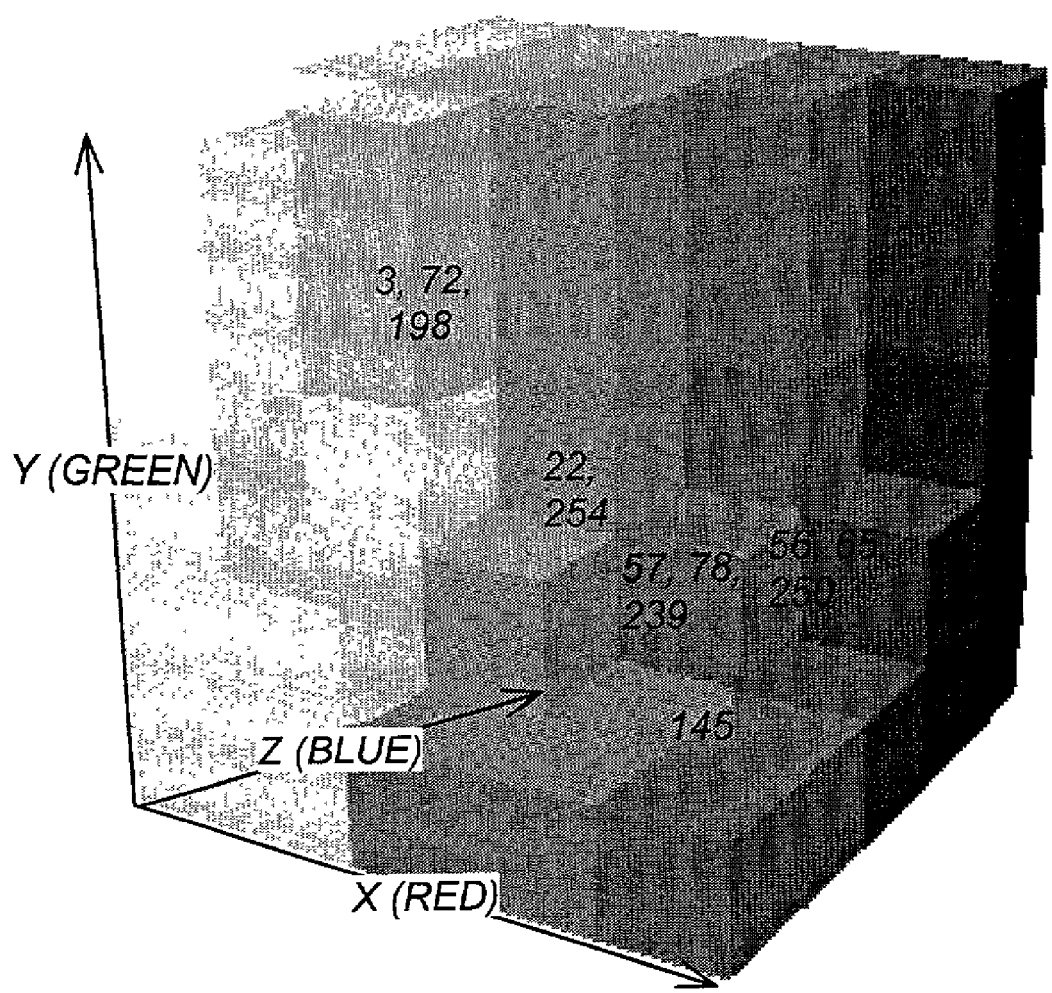
FIG. 3 illustrates an example of a smaller cube in accordance with one or more embodiments of the invention.

Processing may be expedited by first building a smaller cube prior to the creation of the mapping in the larger cube. FIG. 3 illustrates an example of a smaller cube compared to the cube of FIG. 1. Entries in the smaller cube contain not just one index color, but a list of index colors that fall within the color region described within that cube. For example, in a 3-3-3 cube (8 by 8 by 8), the (0,0,0) entry may contain a list of the index colors 0, 5, 29, 87, and 221. Accordingly, the number of entries in the smaller cube is preferably smaller than the list of index colors. Referring to FIG. 3, various color regions and a list of indices for some of those regions are illustrated (e.g., [3, 72, 198], [22, 254], [57, 78, 239], [56, 65, 250], and [145]).

Various mechanisms may be used to determine the appropriate entry of the smaller cube for each index. For example, each entry of the smaller color cube may be compared to the entire list of index colors to determine where each index color should fall. Alternatively, the RGB vector representation of each index color may be mapped into the appropriate color range/region on the smaller color cube. For example, if a color region of the smaller color cube has a range of (22–30 [R], 200–254 [G], 69–89 [B]), an index color of (23, 200, 74) would map into that color region. Thus, each index is examined to map the index to the appropriate smaller color cube entry. When all of the indices have been examined and mapped, the smaller color cube should be fully instantiated with multiple entries per color region.

Once a smaller cube has been created and filled/instantiated with all of the appropriate indices, the larger cube may be traversed to try and find the single best matching index for each color entry/region. However, instead of comparing each vector color of the large color cube against the entire set of index colors (as in the prior art), only those index colors listed in the corresponding entry of the smaller cube are examined.

To determine the corresponding entry in the smaller color cube for each entry in the large color cube, a simple shift operation may be used. Each shift operation (which is performed at the binary level) serves to divide a given binary number by two. Accordingly, depending on the size of the smaller color cube, multiple shift operations for an entry in the large cube may be performed. Thus, a shift operation is performed to determine the corresponding smaller color cube entry. Thereafter, the vector color of the larger color cube is compared to each index color contained in the list in the corresponding smaller color cube entry.

In one or more embodiments, in addition to checking only those index colors listed in the single corresponding small cube, the index colors listed in the immediate neighbors of the corresponding entry may be examined as well. Additionally, if the corresponding smaller cube entry does not contain a list of any colors, the entire set of index colors may be analyzed to determine the appropriate match.

Accordingly, the use of a smaller color cube provides a method of trivially rejecting all those colors that are too far away to be the best match. Using such an approach may reduce the number of color comparisons by a factor of ten without any degradation in accuracy.

Figure 4:
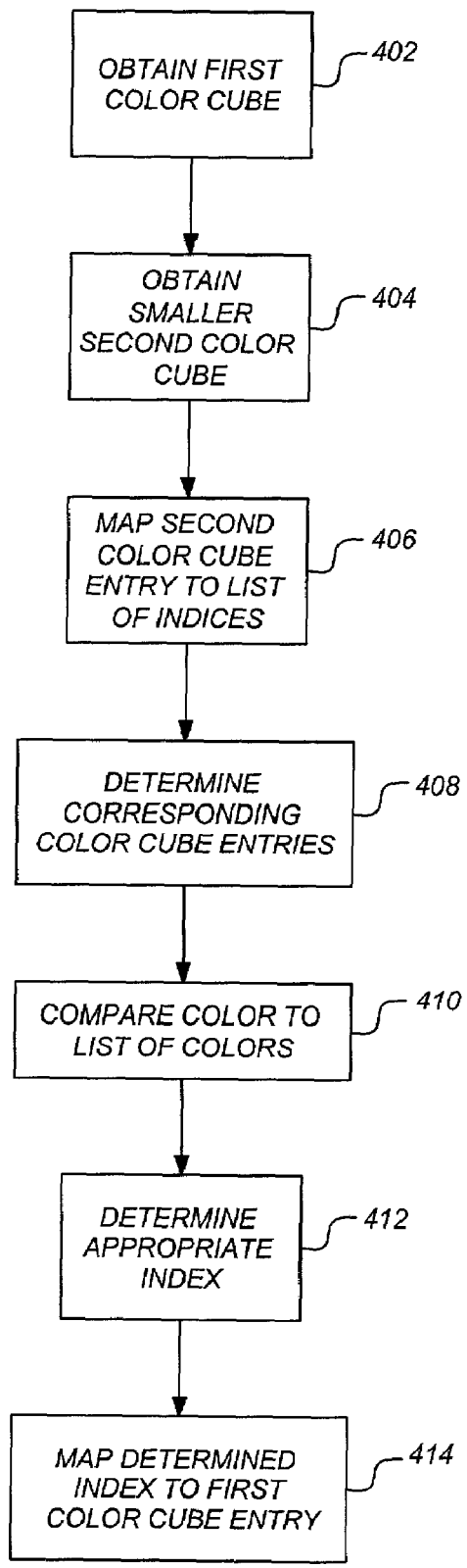
FIG. 4 is a flow chart illustrating the use of a smaller cube to define entries in a color cube in accordance with one or more embodiments of the invention.

FIG. 4 is a flow chart illustrating the use of a smaller cube to define entries in a color cube in accordance with one or more embodiments of the invention. At step 402, the first color cube is obtained. At step 404, a second smaller color cube is obtained. At step 406, each entry in the smaller second color cube is mapped to a list of color indices (or vice versa). Thereafter, the process of instantiating the first color cube with the appropriate color indices begins by traversing each entry in the first color cube. At step 408, the corresponding entry in the second smaller color cube for the entry of the first color cube is determined (e.g., using a shift operation). At step 410, the vector color of the first color cube entry is compared to the list of colors from the corresponding smaller color cube entry. At step 412, the matching color and its corresponding index are determined. The index is then mapped to the large color cube at step 414.

Reverse Mapping

Figure 5:
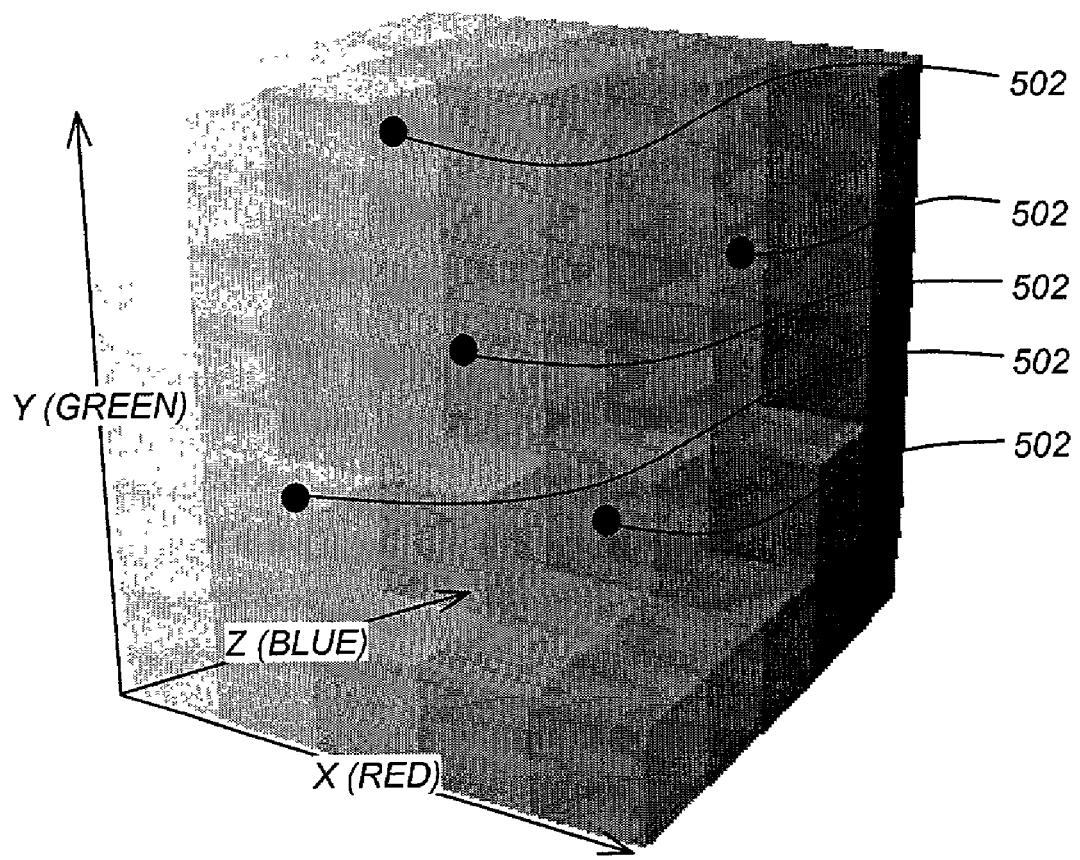
FIG. 5 illustrates a color cube with several points that represent RGB values of various index colors in accordance with one or more embodiments of the invention.

A second technique that takes advantage of the topology of a color cube reverses the direction of the mapping. Instead of stepping through color cube entries, trying to find the best match amongst the index colors, the index colors are stepped through and painted into the color cube, specifically onto those color cube entries closest to the point representing the index color's RGB value. FIG. 5 illustrates a color cube with several points 502 that represent RGB values of various index colors. The index colors 502 are illustrated as points within the space defined by the color cube.

Since the set of index colors is a small set of predefined colors, once the individual colors (e.g., points 502) ate painted into the large color cube and assigned to a color region/entry, numerous color regions will likely not have a corresponding index. Accordingly, a mechanism is needed to further assign the indices to the remaining color cube entries.

In accordance with one or more embodiments of the invention, each index is also assigned to color regions in an expanding area from the original color region to which the color index is assigned. This concept is more easily understood by viewing the points 402 as spheres expanding outwards, all at the same rate. Eventually, the spheres come into contact, and where they contact, they flatten out along the plane of contact, but they will keep expanding in directions where they have not yet made contact. Eventually you are left with a collection of irregular solids (e.g., prisms) fitting together to fill the color cube.

Each of the irregular solids is the collection of color cube entries that would map to the index color that started as the point 502 at the center of the sphere. This is true because if another color index were closet, the expanding sphere for that index color would have gotten to it first. Furthermore, these solids are convex since once a sphere stops expanding in a particular direction, every point beyond that in the same direction will always be closer to another sphere's center.

Due to computation costs that may be associated with painting ever-expanding spheres simultaneously, spheres of a fixed size may be drawn sequentially. When drawing over the initialized value of the cube, the spheres will just draw. However, when drawing over another index color value, color comparisons may be performed for that color cube entry, examining only the pre-existing index color value (i.e., of the original sphere drawn) and the index color value being drawn (i.e., of the new sphere being drawn).

By drawing spheres and only comparing colors in areas of contention (i.e., when an overlap occurs), the number of color comparisons is greatly reduced from that in the prior art. Once the sizes of the color cube and the set of index colors are known, one or more embodiments of the invention empirically or mathematically determine an optimal sphere size that will balance between maximizing the total coverage of the color cube while minimizing the conflicting overlap between the spheres. Additionally, once the sphere size is known, a sphere of the correct size may be easily rendered into a collection of simple output instructions that can be drawn very quickly.

In addition to the above, since the irregular solids have a convex shape, once a first sphere loses to a second sphere already drawn, the first sphere will continue to lose as it moves further out in that direction. Hence, since the output instructions for drawing a sphere performs the draw operation from the inside out, the output instructions may be cut short in a given direction when a sphere loses a comparison contest with one already drawn, further reducing the total color comparisons.

Figure 6:
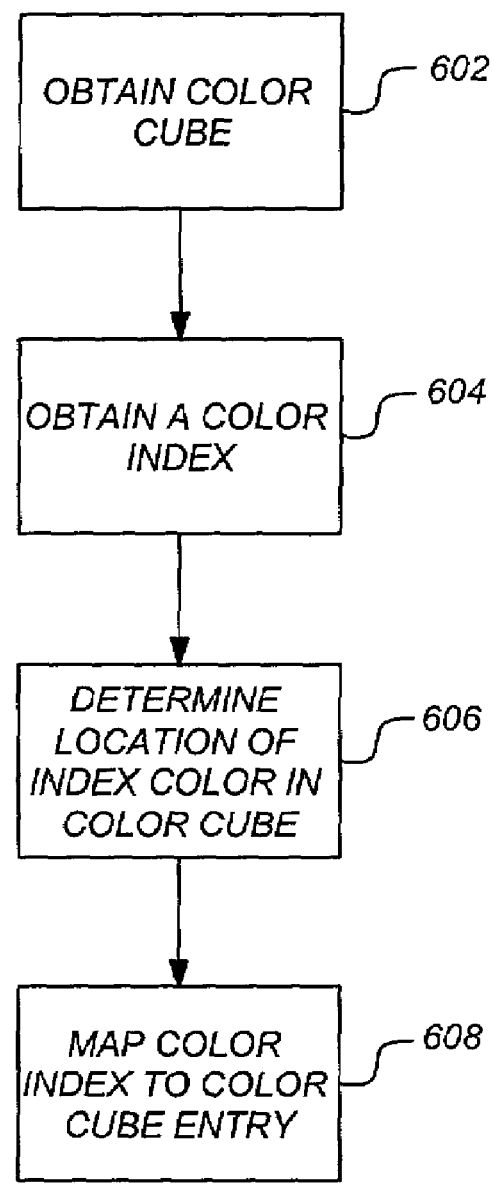
FIG. 6 is a flow chart illustrating the defining of a color cube entry using the reverse mapping technique in accordance with one or more embodiments of the invention.

FIG. 6 is a flow chart illustrating the defining of a color cube entry using the reverse mapping technique in accordance with one or more embodiments of the invention. At step 602, a first color cube is obtained that has one or more color cube entries that each define a color region. At step 604, a color index that represents an index color is obtained.

At step 606, the location of the index color (represented by the color index) within the color cube is determined. At step 608, the color index is mapped to the appropriate color cube entries based on the distance from the determined location. As described above, step 608 may comprise drawing spheres of an expanding or fixed size and assigning the color index to those color regions within or touched by the sphere.

Combination of Reverse Mapping and Small Cube Use

The two techniques described above may be combined into a two-pass approach. In the first pass, reverse mapping is performed (e.g., by drawing the spheres). The reverse mapping technique will fill in most of the cube with the correct index color values. Thereafter, in the second pass, a smaller cube is utilized to fill in the remaining color cube entries that still have their initialized value (i.e., those default or initial values of a cube) with the appropriate color indices. Since drawing spheres typically uses less than one color comparison per color cube entry while the use of smaller cube uses several comparisons per color entry, the spheres are typically oversized and covet the vast majority of the color cube after the first pass.

Accordingly, the first pass and second pass provide for the full instantiation of all of the color regions/entries in the color cube. This two-pass approach may also be used repetitively to create the smaller cube. In such an embodiment, the spheres may be drawn in the smaller cube to fill the smaller cube with the appropriate color indices. Additionally, any combination or order of the above described techniques may be utilized.

Alternative Embodiments

In addition to utilizing the above techniques to instantiate a color cube, the techniques may be generalized to other spatial problems. Thus, the techniques may be used to create a mapping from spatial coordinates of N-dimensions to the nearest member of a fixed set of points.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide a method, apparatus, and article of manufacture for defining one or more entries in a color cube.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for defining one or more entries in a color cube comprising:
   obtaining a first color cube having a first color cube entry that defines a color region;
   obtaining a second color cube having a second color cube entry that defines a color region, wherein the second color cube is smaller in size than the first color cube;
   mapping a list of two or more color indices to the second color cube entry, wherein each color index represents a color that falls within the color region defined by the second color cube entry that the color index is mapped to; and
   determining one or more corresponding second color cube entries for the first color cube entry; and
   determining a color index to be placed in the first color cube entry based on similarity by comparing the color region defined by the first color cube entry to each of the colors represented by the color indices in the one or more corresponding second color cube entries.

2. The method of claim 1 wherein the first color cube defines a range of colors.

3. The method of claim 1 wherein the second color cube defines a small set of predefined colors.

4. The method of claim 1 wherein determining the one or more corresponding second color cube entries for the first color cube entry comprises performing a shift operation on the first color cube entry.

5. The method of claim 1 wherein the one or more corresponding second color cube entries comprise a single corresponding second color cube entry and immediate neighbors of the single corresponding second color cube entry.

6. The method of claim 1 wherein the one or more corresponding second color cube entries are not mapped to any color index and the method further comprises determining a similar color represented by a color index by scanning an entire set of colors represented by color indices.

7. The method of claim 1 wherein the first color cube is defined by red, green, and blue color components as axes of the cube.

8. A method for defining one or more entries in a color cube comprising:
   (a) obtaining a first color cube having one or more first color cube entries wherein each of the one or more first color cube entries define a color region;
   (b) obtaining a first color index that represents a first color;
   (c) determining a location, within the first color cube, of the first color;
   (d) mapping the first color index to a color cube entry defined by a color region containing the location;
   (e) mapping the first color index to one or more additional first color cube entries based on a distance of the color region defined by the one or more additional first color cube entries to the location of the first color represented by the first color index within the first color cube.

9. The method of claim 8 wherein the mapping the first color index to one or more additional first color cube entries comprises:
   mapping one or more additional first color cube entries to the first color index wherein the one or more additional first color cube entries have color regions adjacent to the color region containing the location.

10. The method of claim 8 wherein the mapping steps comprise:
    drawing a first sphere in the first color cube, wherein the first color represented by the first color index is the center of the first sphere; and
    mapping the first color index to one or more first color cube entries having color regions associated with the first sphere.

11. The method of claim 10 further comprising:
    drawing a second sphere, wherein a second color represented by a second color index is the center of the second sphere;

mapping the second color index to one or more first color cube entries having color regions associated with the second sphere; and wherein:

the first sphere and second sphere are drawn expanding outwards; and when the first sphere and second sphere come into contact, the first and second spheres flatten out along a plane of contact but continue to expand in directions they have not yet made contact with.

12. The method of claim 10 further comprising:
   (a) drawing a second sphere, wherein a second color represented by a second color index is the center of the second sphere;
   (b) wherein:
      (i) the first sphere and second sphere are a fixed size;
      (ii) the first sphere and second sphere are drawn sequentially;
      (iii) when the second sphere is drawn with overlapping area with the first sphere:
         (1) determining whether the first color or the second color is most similar to the color region containing the overlapping area by comparing the color region defined by the first color cube entry that contains the overlapping area to the first color and the second color; and
         (2) mapping the index representing the most similar color to the first color cube entry.

13. The method of claim 12 wherein once the first color or second color has been determined not to be similar to a color region in a particular direction, the determined color is eliminated from future comparisons in the particular direction.

14. The method of claim 8 further comprising:
   obtaining a second color cube having one or more second color cube entries that defines a color region, wherein the second color cube is smaller in size than the first color cube;
   mapping a list of two or more color indices to the second color cube entry, wherein each color index represents a color that falls within the color region defined by the second color cube entry that the color index is mapped to; and
   determining one or more corresponding second color cube entries for one or more first color cube entries; and
   determining the color index to be mapped to the one or more first color cube entries based on similarity by comparing the color region defined by the one or more first color cube entries to each of the colors represented by the color indices in the one or more corresponding second color cube entries.

15. An article of manufacture comprising a program storage medium readable by a computer and embodying one or more instructions executable by the computer to perform a method for defining one or more entries in a color cube, the method comprising:
   obtaining a first color cube having a first color cube entry that defines a color region;
   obtaining a second color cube having a second color cube entry that defines a color region, wherein the second color cube is smaller in size than the first color cube;
   mapping a list of two or more color indices to the second color cube entry, wherein each color index represents a color that falls within the color region defined by the second color cube entry that the color index is mapped to; and
   determining one or more corresponding second color cube entries for the first color cube entry; and
   determining a color index to be placed in the first color cube entry based on similarity by comparing the color region defined by the first color cube entry to each of the colors represented by the color indices in the one or more corresponding second color cube entries.

16. The article of manufacture of claim 15 wherein the first color cube defines a range of colors.

17. The article of manufacture of claim 15 wherein the second color cube defines a small set of predefined colors.

18. The article of manufacture of claim 15 wherein determining one or more corresponding second color cube entries for the first color cube entry comprises performing a shift operation on the first color cube entry.

19. The article of manufacture of claim 15 wherein the one or more corresponding second color cube entries comprise a single corresponding second color cube entry and immediate neighbors of the single corresponding second color cube entry.

20. The article of manufacture of claim 15 wherein the one or more corresponding second color cube entries are not mapped to any color index and the method further comprises determining a similar color represented by a color index by scanning an entire set of colors represented by color indices.

21. The article of manufacture of claim 15 wherein the first color cube is defined by red, green, and blue color components as axes of the cube.

22. An article of manufacture comprising a program storage medium readable by a computer and embodying one or more instructions executable by the computer to perform a method for defining one or more entries in a color cube, the method comprising:
   (a) obtaining a first color cube having one or more first color cube entries wherein each of the one or more first color cube entries define a color region;
   (b) obtaining a first color index that represents a first color;
   (c) determining a location, within the first color cube, of the first color;
   (d) mapping the first color index to a color cube entry defined by a color region containing the location;
   (e) mapping the first color index to one or more additional first color cube entries based on a distance of the color region defined by the one or more additional first color cube entries to the location.

23. The article of manufacture of claim 22 wherein mapping the first color index to one or more additional first color cube entries comprises:
   mapping one or more additional first color cube entries to the first color index wherein the one or more additional first color cube entries have color regions adjacent to the color region containing the location.

24. The article of manufacture of claim 22 wherein the mapping steps comprise:
   drawing a first sphere in the first color cube, wherein the first color represented by the first color index is the center of the first sphere; and
   mapping the first color index to one or more first color cube entries having color regions associated with the first sphere.

25. The article of manufacture of claim 24, the method further comprising:
   drawing a second sphere, wherein a second color represented by a second color index is the center of the second sphere;

mapping the second color index to one or more first color cube entries having color regions associated with the second sphere; and wherein:

the first sphere and second sphere are drawn expanding outwards; and when the first sphere and second sphere come into contact, the first and second spheres flatten out along a plane of contact but continue to expand in directions they have not yet made contact with.

26. The article of manufacture of claim 24, the method further comprising:
   (a) drawing a second sphere, wherein a second color represented by a second color index is the center of the second sphere;
   (b) wherein:
      (i) the first sphere and second sphere are a fixed size;
      (ii) the first sphere and second sphere are drawn sequentially;
      (iii) when the second sphere is drawn with overlapping area with the first sphere:
         (1) determining whether the first color or the second color is most similar to the color region containing the overlapping area by comparing the color region defined by the first color cube entry that contains the overlapping area to the first color and the second color; and
         (2) mapping the index representing the most similar color to the first color cube entry.

27. The article of manufacture of claim 26 wherein once the first color or second color has been determined not to be similar to a color region in a particular direction, the determined color is eliminated from future comparisons in the particular direction.

28. The article of manufacture of claim 22, the method further comprising:
   obtaining a second color cube having one or more second color cube entries that defines a color region, wherein the second color cube is smaller in size than the first color cube;
   mapping a list of two or more color indices to the second color cube entry, wherein each color index represents a color that falls within the color region defined by the second color cube entry that the color index is mapped to; and
   determining one or more corresponding second color cube entries for one or more first color cube entries; and
   determining the color index to be mapped to the one or more first color cube entries based on similarity by comparing the color region defined by the one or more first color cube entries to each of the colors represented by the color indices in the one or more corresponding second color cube entries.

29. An apparatus for defining one or more color cube entries in a computer system comprising:
   (a) a computer system having a memory;
   (b) a first color cube stored in the memory of the computer system, wherein the first color cube has a first color cube entry that defines a color region;
   (c) a second color cube stored in the memory of the computer system, wherein:
      (i) the second color cube has a second color cube entry that defines a color region; and
      (ii) the second color cube is smaller in size than the first color cube;
   (d) a computer program executing on the computer system, wherein the computer program is configured to:
      (i) map a list of two or more color indices to the second color cube, wherein each color index represents a color that falls within the color region defined by the second color cube entry that the color index is mapped to;
      (ii) determine one or more corresponding second color cube entries for the first color cube entry; and
      (iii) determine a color index to be placed in the first color cube entry based on similarity by comparing the color region defined by the first color cube entry to each of the colors represented by the color indices in the one or mote corresponding second color cube entries.

30. The apparatus of claim 29 wherein the first color cube defines a range of colors.

31. The apparatus of claim 29 wherein the second color cube defines a small set of predefined colors.

32. The apparatus of claim 29 wherein the computer program is configured to determine one or mote corresponding second color cube entries for the first color cube entry using a shift operation on the first color cube entry.

33. The apparatus of claim 29 wherein the one or more corresponding second color cube entries comprise a single corresponding second color cube entry and immediate neighbors of the single corresponding second color cube entry.

34. The apparatus of claim 29 wherein the one or more corresponding second color cube entries are not mapped to any color index and the method further comprises determining a similar color represented by a color index by scanning an entire set of colors represented by color indices.

35. The apparatus of claim 29 wherein the first color cube is defined by red, green, and blue color components as axes of the cube.

36. An apparatus for defining one or more color cube entries in a computer system comprising:
   (a) a computer system having a memory;
   (b) a first color cube stored in the memory of the computer system, wherein the first color cube has one or more first color cube entries wherein each of the one or more first color cube entries define a color region;
   (c) a computer program executing on the computer system, wherein the computer program is configured to:
      (i) obtain a first color index that represents a first color;
      (ii) determine a location, within the first color cube, of the first color;
      (iii) map the first color index to a color cube entry defined by a color region containing the location; and
      (iv) map the first color index to one or more additional first color cube entries based on a distance of the color region defined by the one or more additional first color cube entries to the location.

37. The apparatus of claim 36 wherein the computer program is configured to map the first color index to one or more additional first color cube entries by:
   mapping one or more additional first color cube entries to the first color index wherein the one or more additional first color cube entries have color regions adjacent to the color region containing the location.

38. The apparatus of claim 36 wherein the computer program is configured to map by:
   drawing a first sphere in the first color cube, wherein the first color represented by the first color index is the center of the first sphere; and
   mapping the first color index to one or more first color cube entries having color regions associated with the first sphere.

39. The apparatus of claim 38, the computer program further configured to:
- draw a second sphere, wherein a second color represented by a second color index is the center of the second sphere;
- map the second color index to one or more first color cube entries having color regions associated with the second sphere; and
- wherein:
  - the first sphere and second sphere are drawn expanding outwards; and
  - when the first sphere and second sphere come into contact, the first and second spheres flatten out along a plane of contact but continue to expand in directions they have not yet made contact with.

40. The apparatus of claim 38, the computer program further configured to:
- (a) draw a second sphere, wherein a second color represented by a second color index is the center of the second sphere;
- (b) wherein:
  - (i) the first sphere and second sphere are a fixed size;
  - (ii) the first sphere and second sphere ate drawn sequentially;
  - (iii) when the second sphere is drawn with overlapping area with the first sphere:
    - (1) determining whether the first color or the second color is most similar to the color region containing the overlapping area by comparing the color region defined by the first color cube entry that contains the overlapping area to the first color and the second color; and
    - (2) mapping the index representing the most similar color to the first color cube entry.

41. The apparatus of claim 40 wherein once the first color or second color has been determined not to be similar to a color region in a particular direction, the determined color is eliminated from future comparisons in the particular direction.

42. The apparatus of claim 36 further comprising a second color cube stored in the memory of the computer system, wherein:
- (a) the second color cube has one or more second color cube entries that define a color region;
- (b) the second color cube is smaller in size than the first color cube; and
- (c) the computer program is further configured to:
  - (i) map a list of two or more color indices to the second color cube entry, wherein each color index represents a color that falls within the color region defined by the second color cube entry that the color index is mapped to;
  - (ii) determine one or more corresponding second color cube entries for one or more first color cube entries; and
  - (iii) determine the color index to be mapped to the one or more first color cube entries based on similarity by comparing the color region defined by the one or more first color cube entries to each of the colors represented by the color indices in the one or more corresponding second color cube entries.

* * * * *